March 25, 1941.   W. F. GRISHAM   2,236,137
FLOW VALVE
Filed Feb. 25, 1938

Inventor
William F. Grisham.

By Clarence A. O'Brien
Hyman Berman
Attorneys

Patented Mar. 25, 1941

2,236,137

UNITED STATES PATENT OFFICE 2,236,137

FLOW VALVE

William F. Grisham, Royalty, Tex.

Application February 25, 1938, Serial No. 192,660

1 Claim. (Cl. 103—232)

This invention relates to a valve for flowing oil wells, and the general object of the invention is to provide a valve actuated by pressure of liquid collecting in the well and controlling fluid under pressure, which, when released by the valve, acts to force the liquid or oil from the well.

This invention also consists in certain other features of construction and in the combination and arrangement of the several parts to be hereinafter fully described, illustrated in the accompanying drawing and specifically pointed out in the appended claim.

In describing the invention in detail, reference will be had to the accompanying drawing wherein like characters denote like or corresponding parts throughout the several views, and in which.

Figure 1:
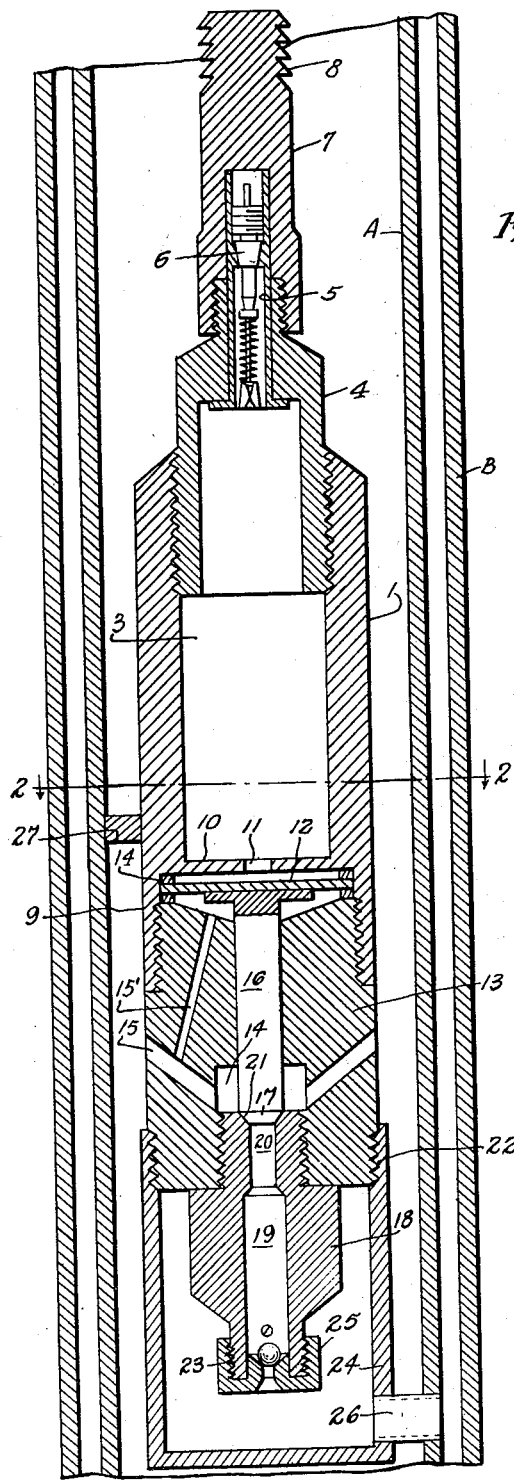
Figure 1 is a longitudinal sectional view through the invention.
Figure 2:
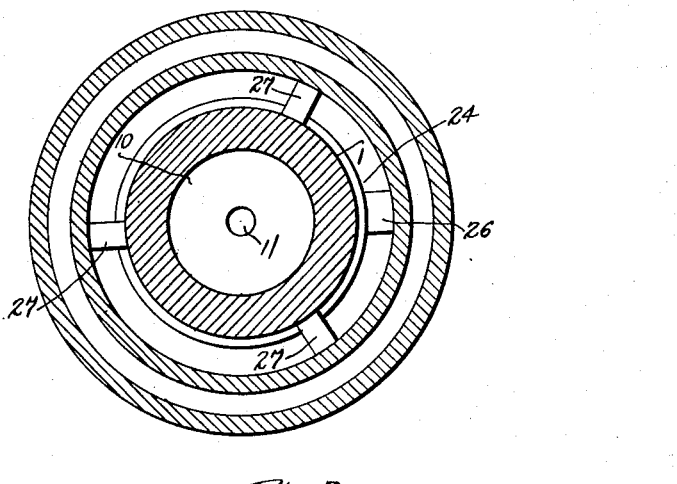
Figure 2 is a section on line 2—2 of Figure 1.

In this drawing, the numeral 1 indicates a member having a chamber 3 therein, the outer end of which is closed by a nipple 4 which is threaded in said outer end of the chamber as shown and a valve casing 5 passes through the outer end of the nipple and contains the usual or any desired type of air valve shown generally at 6 which enables air to be forced into the chamber 3 and the hollow part of the nipple. A fishing neck 7 is adapted to be threaded on to the outer end of the nipple and encloses the projecting part of the valve casing and has the grooves 8 in its outer end so that a fishing tool or the like can grip the member 7 to pull the entire device from the well. An internally threaded skirt 9 is formed on the lower end of the member 1 and the chamber formed by this skirt is divided from the chamber 3 by a partition member 10 which has a centrally arranged hole 11 therein. A diaphragm 12 is suitably supported across the inner end of the chamber formed by the skirt so that it will be acted upon by the pressure in the chamber 3 which passes through the hole 11 and a plug 13 is threaded in the skirt and acts to hold the diaphragm supporting collars 14 in position. This plug has a small chamber 14 therein from which radiates the upwardly inclined passages 15 and it is formed with a bore for the passage of the stem 16 having one end connected with the diaphragm and its other end forms a valve 17, a portion of this stem passing through the chamber 14. A passage 15' connects one of the passages 15 with the space below the diaphragm. A member 18 is threaded in the outer end of the plug and is formed with a bore 19 having its upper portion reduced as at 20 and a valve seat 21 is formed at the upper end of the reduced part for the valve 17. The lower end of the plug is threaded as at 22 and the lower end of the member 18 is threaded as at 23.

A chamber forming member 4, of any suitable construction has its upper end threaded to the threaded part 22 of the plug 13 and an upwardly opening ball check valve 25 is threaded to the part 23 of member 18. A certain amount of air or the like is introduced into the chamber 3 past the valve 6 after the member 7 has been removed and then said member is replaced.

The device is placed in a well tube and held therein in such a manner that the oil can flow past the same and the chamber forming member 24 is placed in communication with a source of fluid under pressure which may be either natural gas, artificial gas or compressed air introduced into the member in any suitable manner. This compressed fluid is prevented from escaping through the passages 19 and 20 into the chamber 14 by the valve 17 and said valve is held on its seat 21 by the compressed air in the chamber 3 acting on the diaphragm 12.

The device is held in the tubing A of the well casing B in any suitable manner and in a manner that it can be readily removed without removing the tubing. The drawing shows the member 24 as threaded to the plug 13 at 22 and this member 24 connected by a tube 26 with the tubing A and this tube 26 places the interior of the member 24 in communication with the space between the tubing A and the well casing B so that gases either introduce into the well casing into the space between the casing and the tubing or rising into the casing from the well will enter the member 24. Spacers 27 are located between the part 1 of the device and the tubing and while in the construction shown one or a plurality of the tubes 26 will support the device in the tubing so that by turning the device it will be unthreaded from the member 24 so that it can be removed, it is to be understood that any suitable means can be used for removably supporting the device in the well tubing and any suitable means can be used for leading compressed fluid into the passage 19 of the device.

Supposing the pressure in chamber 3 is 115 pounds and the pressure in passage 19 is 250, when the oil rises in the well tube to a height to create a pressure on the lower part of the diaphragm 12, thru ports 15 and 15' of 100 pounds, this pressure and the pressure of 250 pounds in 19 will open the valve 17 so that the fluid under pressure in 19 and in the member 24 will pass into the chamber 14 and through the passages 15 into the well tube and thus force the oil in the tubing upwardly and out at the top of the well. This flow of fluid pressure into the well tubing will raise the pressure in the well tubing above 100 pounds. After oil is ejected from the well tubing the pressure in the tubing will drop almost to atmosphere due to the relative sizes of the well tubing and the restricted part 20 of the passage 19. When this pressure in the chamber 14 has dropped to 110 pounds the pressure in chamber 3 will cause the diaphragm to close the valve 17 and the valve will stay closed until the oil in the well tubing has again reached a height to again create 100 pounds pressure in the tubing and chamber 14. Thus it will be seen that valve 17 will close at 10 pounds higher pressure than it opens which results in a material saving in the pressure fluid. Stated otherwise the hydrostatic head of the oil column in the tubing will be added to the pressure of the gas on the lower end of the valve and the sum of these will overcome the pressure in chamber 3 above the diaphragm, which causes the valve to open. This will permit the gas under 250 pounds pressure to pass into the oil and raise it through the tubing. As soon as the oil column in the tubing is lifted the pressure drops and the reduced part or throttling orifice 20 below the valve will reduce the pressure at that point that is effective to hold the valve open and thus the constant 115 pound pressure in chamber 3 above the diaphragm will be more effective in closing the valve against the decreasing pressure in the tubing, thus causing the valve to close at a higher pressure than that at which it opens. However, as soon as the valve closes and the gas flow through the orifice 20 is stopped, the pressure reduction due to high velocity through orifice 20 is no longer effective, the added force due to the 250 pounds pressure against the bottom of the valve will be effective so that the valve will open at a lower pressure exerted in the tubing on the underside of the diaphragm when the liquid head has built up to the proper value. It will, of course, be understood that the pressures given are only approximate and by making the parts 19, 21, 16 and 20 of different sizes, to change differential of opening and closing pressures, the device can be made to operate under different pressures.

As will be seen this invention eliminates the use of pumps and it enables the highest pressure to be maintained in the well casing and a low pressure on the well formation. This allows more oil to enter the well and thus increases production. The check valve 25 prevents any well fluid passing into the member 24 if the valve 16 should fail to close for any reason.

It is thought from the foregoing description that the advantages and novel features of the invention will be readily apparent.

It is to be understood that changes may be made in the construction and in the combination and arrangement of the several parts provided that such changes fall within the scope of the appended claim.

Having described the invention, what is claimed as new is:

A flow producing device for use in a well tubing comprising a body having a chamber in its upper part, a small chamber in its intermediate part and a passage in its lower part connected with a source of fluid under pressure and opening out at its upper end into the small chamber, said body also having upwardly and outwardly extending passages leading from the small chamber through the side walls of the body, means for introducing fluid into the upper chamber to maintain a fixed pressure therein, a diaphragm carried by the intermediate part of the body and acted upon by the pressure in the large chamber and said body having a passage leading from the exterior thereof to a point under the diaphragm, a valve having its upper end connected with the diaphragm and said valve passing through an intermediate part of the body and through the small chamber and normally holding closed the upper end of the passage connected with the source of fluid under pressure, said passage having a restricted upper portion, the top of which forms a valve seat for the valve.

WILLIAM F. GRISHAM.